July 11, 1950   C. D. BURNEY   2,514,536
PLANT GROWING BLOCK FOR A DECORATIVE FENCE CONSTRUCTION
Filed Aug. 11, 1947

INVENTOR
CLYDE D. BURNEY
BY
Mason & Graham
ATTORNEYS

Patented July 11, 1950

2,514,536

UNITED STATES PATENT OFFICE 2,514,536

PLANT GROWING BLOCK FOR A DECORATIVE FENCE CONSTRUCTION

Clyde D. Burney, Los Angeles, Calif.

Application August 11, 1947, Serial No. 767,975

8 Claims. (Cl. 47—34)

My invention has to do with building blocks, relating more particularly to blocks from which a decorative fence, wall or the like or a decorative portion of a fence or wall may be constructed, it being an object to provide a building block or a combination of blocks which may be used to erect a fence or the like or portion thereof, in which flowers or other plants may be grown and appear as growing out of the fence.

My invention also has as an object the provision of a construction wherein a combination of blocks are provided, in which the blocks are so assembled that a common, vertically extending passageway or opening for water or liquid fertilizer may be provided in communication with soil-containing cavities in all the blocks, and in which one block cooperates with a contiguous block to provide a plant-growing receptacle and a space for the plant to grow and be viewed from the side of the block.

My invention also has as an object the provision of a block construction wherein one or more blocks embodying the invention may be used in the chemical culture of plants by feeding chemicals from a common chamber or cavity.

Other objects will appear from the following description of a presently preferred example of the invention, for which purpose I shall refer to the accompanying drawings, wherein.

It will be understood, of course, that the drawings and the following description are intended merely for illustrative purposes only, and that the invention in its broader aspects as defined by the accompanying claims may be carried out by other specific structures coming within the scope of said claims.

Figure 1:
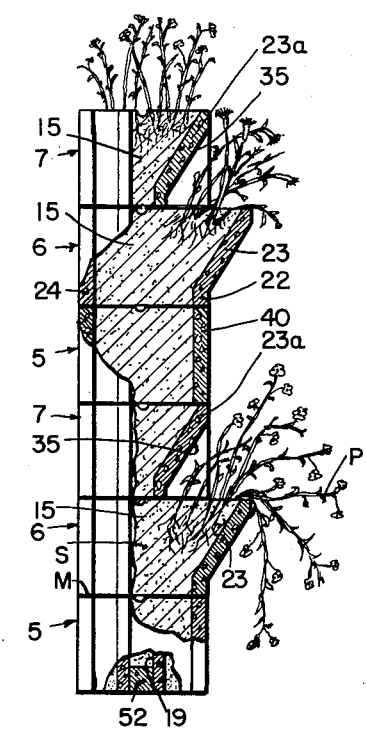
Fig. 1 is a view partly in section and partly in side elevation of a section of a wall or fence embodying my invention.
Figure 2:
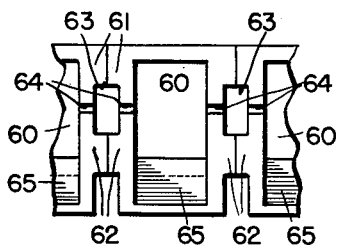
Fig. 2 is a view showing an end elevation of blocks of my invention.

Referring now to the drawings, in Fig. 1 I show a spacer block 5, a base block 6 and an upper block 7, superimposed one upon another to form, in this example, a section of fence. Those blocks may be of cast or moulded concrete or other suitable material having ample structural strength.

The base block 6 has two cavities 15, 16 extending from the top to the bottom and separated by a division wall 17, the division wall having three passageways 18, 19 and 20 for the purpose to be described.

The front wall 22 has outwardly and upwardly sloping portions 23 defining the fronts of the respective cavities 15, 16, the back wall 24 being straight. Each of the cavities 15, 16 is adapted to be filled with soil S in which a plant P may be grown.

Figure 6:
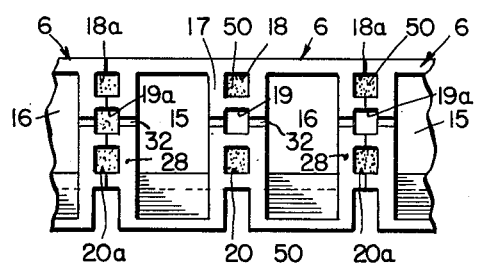
Figure 6 is a top plan view showing an assembly of three base blocks in end-to-end engagement.
Figure 3:
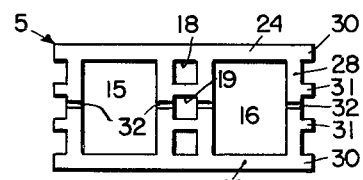
Fig. 3 is a top plan view of a spacer block.

Each of the two end walls 28 of each block presents four vertical ribs, the two outermost being designated by the numeral 30 and the two innermost being designated by the numeral 31. The end ribs of each block register with and abut the like end ribs of contiguous blocks to form therebetween the openings 18a, 19a, 20a shown in Fig. 6, which latter openings are like, and serve the same purposes as, the openings 18—20.

The partition wall 17 and each of the end walls 28 have in their top edges a transverse groove or passageway 32 communicating from the respective openings 19, 19a to the adjacent cavities, for the purpose to be described.

Referring now to the upper block 7 it is constructed exactly like the block 6, and its parts are given like reference numerals, except that the portions 23a of the front wall of the block extend upwardly and outwardly from a point spaced inwardly substantially from the plane of the outer front surface of the block to a point flush with said outer front surface, so that a sloping recess 35 is formed beneath each of the front wall portions 23a for the purpose to be described.

The spacer block 5 is constructed like blocks 6 and 7 and its parts are given like reference numerals, except that the front wall 40 is straight or parallel with the back wall 24.

Figure 7:
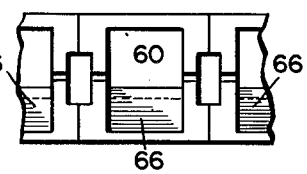
Fig. 7 is a reduced elevation of a wall or fence embodying my invention.

The use and function of the blocks will now be described. For instance, if it be desired to use stacks of the blocks at spaced points along a fence, as shown in Fig. 7, it is usually desirable to place one of the spacer blocks 5 at the bottom and one between each pair of blocks 6, 7. On the spacer block is placed a base block 6 and on top of each base block 6 there is an upper block 7. Duplications of this procedure may be carried out until the structure reaches the desired height (Figs. 1 and 7).

Between the stacks of blocks may be interposed any desired type of fence construction, as, for instance, conventional blocks or bricks B. Of course, an entire fence may be constructed of my blocks if desired, and they may be staggered in the usual manner of laying blocks or bricks. Also, my blocks may be placed side by side along the top of the entire length of the fence.

While the blocks may be bonded together by suitable mortar being applied therebetween, as shown at M in Fig. 1, they may also be held together in alignment by means of grout and reinforcing, denoted 50, applied in the registering openings 18, 20, 18a, 20a, since the openings 18—20 of each block are aligned and register either with the openings 18—20 or 18a—20a of blocks below and above.

As shown in Fig. 1, the cavities 15, 16 are filled with soil S, there being a column of soil then extending from the topmost block to the bottommost block. Suitable plants P may be planted in the soil. To water and fertilize the plants growing in the soil in the cavities, fertilizer-enriched water may be poured into the opening 19 in the topmost block. This water will gradually pass into the soil in the cavities 15, 16 through the grooves 32. The opening 19 in the bottommost block may be closed as by a plug 52 so that the water will not seep into the ground beneath the fence.

It will be observed that each of the recesses 35 in the respective upper blocks provides a space for the top portion of a plant growing in the underlying cavity of the underlying base block, and the sloping wall 23a also affords a background for the growing plant when viewed from the front of the fence. Usually it is desirable to use the upper block 6 to form the top of the fence so that plants may grow in the cavities 15, 16 of those blocks and appear above the fence.

It is contemplated that, within the broader scope of the invention, various modified forms of block may be made. For instance, the two openings 18, 20 provided in the presently preferred form shown in Figs. 1 to 7, for the reception of grout and reinforcing, may be eliminated if the bond between the top and bottom surfaces of contiguous superimposed blocks is ample to hold the structure in rigid assembly. Also, blocks with but a single cavity 15 or 16 may be provided.

Figure 8:
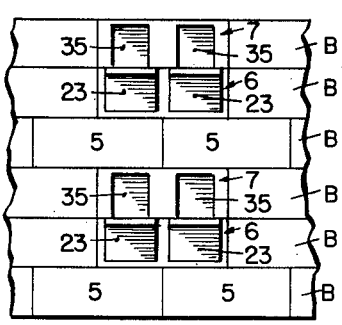
Fig. 8 is a top plan view showing a modified form of base block.

For instance, in Fig. 8 there is shown a modified form of base block, each of the juxtaposed blocks shown in this figure having but a single soil-receiving cavity 60 and only two end ribs 61, 62. The two end ribs 61, 62 of blocks laid end to end in abutting relationship, together define a liquid-receiving opening 63, and the liquid, such as water or fertilizer-enriched water, passes from this opening into the cavities of the blocks through grooves 64 formed preferably in the top surfaces of the block. The front wall portion 65, defining the front portion of the cavity 60, slopes upwardly and outwardly in the manner of the wall 23 in Figs. 1 to 7.

Figure 9:
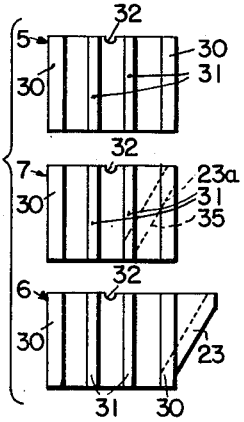
Fig. 9 is a top plan view of a modified form of upper block.
Figure 4:
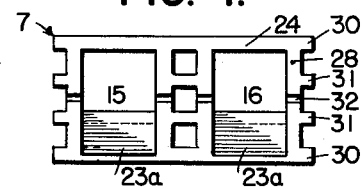
Fig. 4 is a top plan view of an upper block.
Figure 5:
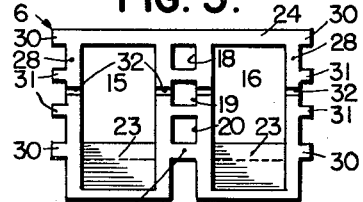
Fig. 5 is a top plan view of a base block.

In Fig. 9 there is shown a modified form of upper block designed to be used in conjunction with the block of Fig. 8. This block is constructed exactly like that of Fig. 8, and its parts are given like reference numerals, except that the front wall portion 66 slopes upwardly and outwardly from a point spaced inwardly from to a point flush with the plane of the front of the block.

Figure 10:
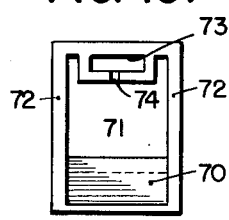
Fig. 10 is a top plan view of another modified form of base block.

In Fig. 10 I show a further modification of the base block in which the end ribs are eliminated, and only a single cavity is provided. Here the front wall portion 70 defining the front of the cavity 71 slopes upwardly and outwardly to a point outwardly from the plane of the front of the block, like the base blocks previously described. The end walls 72 are plane and a liquid-receiving vertical opening 73 is formed in the back wall of the block, communicating with the cavity through a groove 74 formed in the top surface of the block. The upper block of Fig. 11 is designed for use in conjunction with the base block of Fig. 10, being the same in construction and its parts being given like refence numerals, except that the front wall portion 76 slopes upwardly and outwardly from a point spaced inwardly from to a point flush with the outer front surface of the block.

Figure 11:
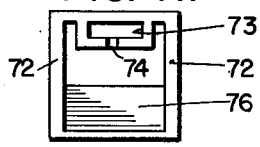
Fig. 11 is a top plan view of another modified form of upper block.

In the use of the blocks of Figs. 8 and 9, when they are superimposed one on the other, the cavities 60 and the openings 63 register and communicate with each other and the same is true of the cavities and openings of the blocks of Figs. 10 and 11.

I claim:

1. A block for forming a decorative fence or the like, comprising a hollow body having parallel end walls and side walls and a transverse division wall separating the body interior into a pair of soil-receiving cavities extending vertically through the body, said division wall having a liquid-receiving opening from its top to its bottom and transverse passageways providing communication from said opening to said cavities; said side walls being parallel with each other except that the upper portion of one of them slopes outwardly and upwardly.

2. A block for use in forming a decorative fence or the like, comprising a hollow body having parallel end walls and side walls and a transverse division wall separating the body interior into a pair of soil-receiving cavities extending vertically through the body, the side walls being parallel with each other except that the upper portion of one of them slopes outwardly and upwardly; said division wall having a liquid-receiving opening from its top to its bottom and transverse passageways providing communication from said opening to said cavities, and each of said end walls presenting spaced parallel ribs whereby when a plurality of said blocks are placed in abutting side by side relationship the ribs of contiguous blocks together form a liquid-receiving opening therebetween, each of said end walls also having a transverse liquid passageway providing communication from the last-named opening to the contiguous cavity.

3. A combination of building blocks comprising a base block and an upper block superimposed thereon, each of said blocks having front, back and end walls defining a soil-receiving cavity in which a plant may be grown, the front wall of the base block having a portion sloped outwardly and upwardly to a point beyond the plane of the front wall of the upper block, and the front wall of the upper block having a portion sloped inwardly and downwardly from the plane of said front wall, whereby to provide an upwardly opening cavity and a downwardly opening recess overlying the cavity in the base block.

4. A combination of building blocks comprising a base block and an upper block superimposed thereon, each of said blocks having front, back and end walls defining a soil-receiving cavity in which a plant may be grown, the front wall of the base block having a portion sloped outwardly and upwardly to a point beyond the plane of the front wall of the upper block, and the front wall of the upper block having a portion sloped inwardly and downwardly from the plane of said front wall whereby to provide an upwardly opening cavity and a downwardly opening recess overlying the cavity in the base block, said cavities being in vertical alignment and in communication with each other.

5. A combination of building blocks comprising a base block and an upper block superimposed thereon, each of said blocks having front, back and end walls defining a soil-receiving cavity in which a plant may be grown, the front wall of the base block having a portion sloped outwardly and upwardly to a point beyond the plane of the front wall of the upper block, and the front wall of the upper block having a portion sloped inwardly and downwardly from the plane of said front wall whereby to provide an upwardly opening cavity and a downwardly opening recess overlying the cavity in the base block, and each of the blocks having a liquid-receiving opening in communication with its said cavity.

6. A combination of building blocks comprising a base block and an upper block superimposed thereon, each block having a pair of horizontally spaced soil-receiving cavities separated by a division wall having a vertical liquid-receiving opening from its top to its bottom and transverse liquid passageways providing communication between the opening and said cavities; the cavities and the opening in the division wall of the base block underlying and communicating with the respective cavities and the opening in the division wall of the upper block, the front wall of each block having an upwardly and outwardly sloping portion defining the front of said cavity.

7. A combination of building blocks comprising a base block and an upper block superimposed thereon, each block having a pair of horizontally spaced soil-receiving cavities separated by a division wall having a vertical liquid-receiving opening from its top to its bottom and transverse liquid passageways providing communication between the opening and said cavities; the cavities and the opening in the division wall of the base block underlying and communicating with the respective cavities and the opening in the division wall of the upper block, the front wall of the base block having portions sloping upwardly and outwardly to points beyond the plane of the front of said block to define the fronts of said cavities, and the front wall of the upper block having front wall portions sloping upwardly and outwardly from points spaced inwardly from to points substantially flush with the plane of the front of said block, to define the fronts of said cavities.

8. A block adapted for use in combination with with other like blocks to form a decorative fence, comprising a hollow body having parallel end walls and having front and back walls parallel with each other except that a portion of the front wall slopes outwardly and upwardly, said walls defining a soil receiving cavity opening through the top and bottom of the body whereby when a plurality of said blocks are stacked one on another the cavities thereof register and communicate with each other.

CLYDE D. BURNEY.

REFERENCES CITED

The following references are of record in the file of this patent:

UNITED STATES PATENTS

| Number | Name | Date |
|---|---|---|
| 297,932 | Groves | Apr. 29, 1884 |
| 1,180,058 | McNutt | Apr. 18, 1916 |
| 1,217,239 | Swartz | Feb. 27, 1917 |
| 2,019,653 | Buyer | Nov. 5, 1935 |

FOREIGN PATENTS

| Number | Country | Date |
|---|---|---|
| 15,082 | Great Britain | A. D. 1901 |